June 28, 1960

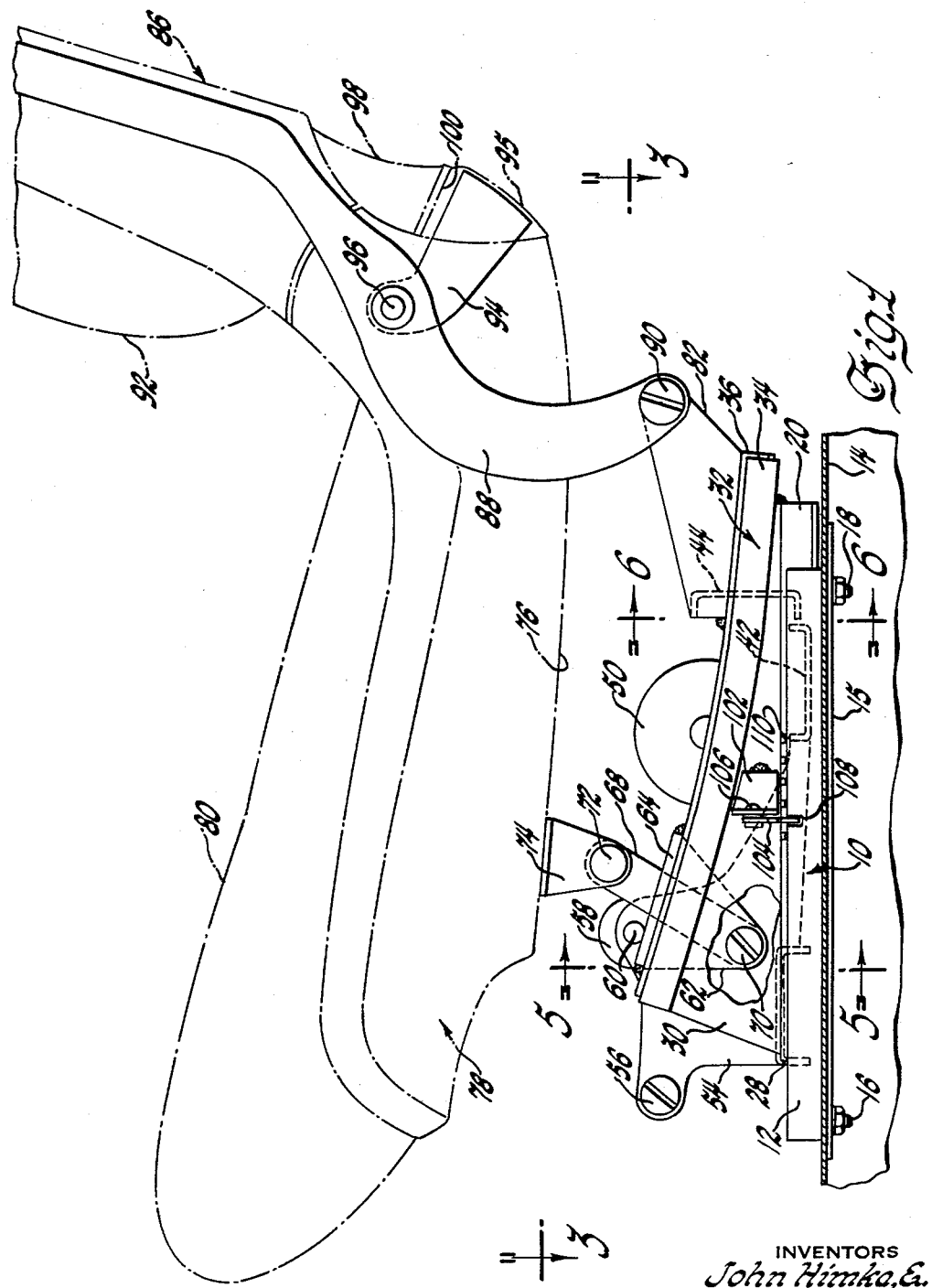

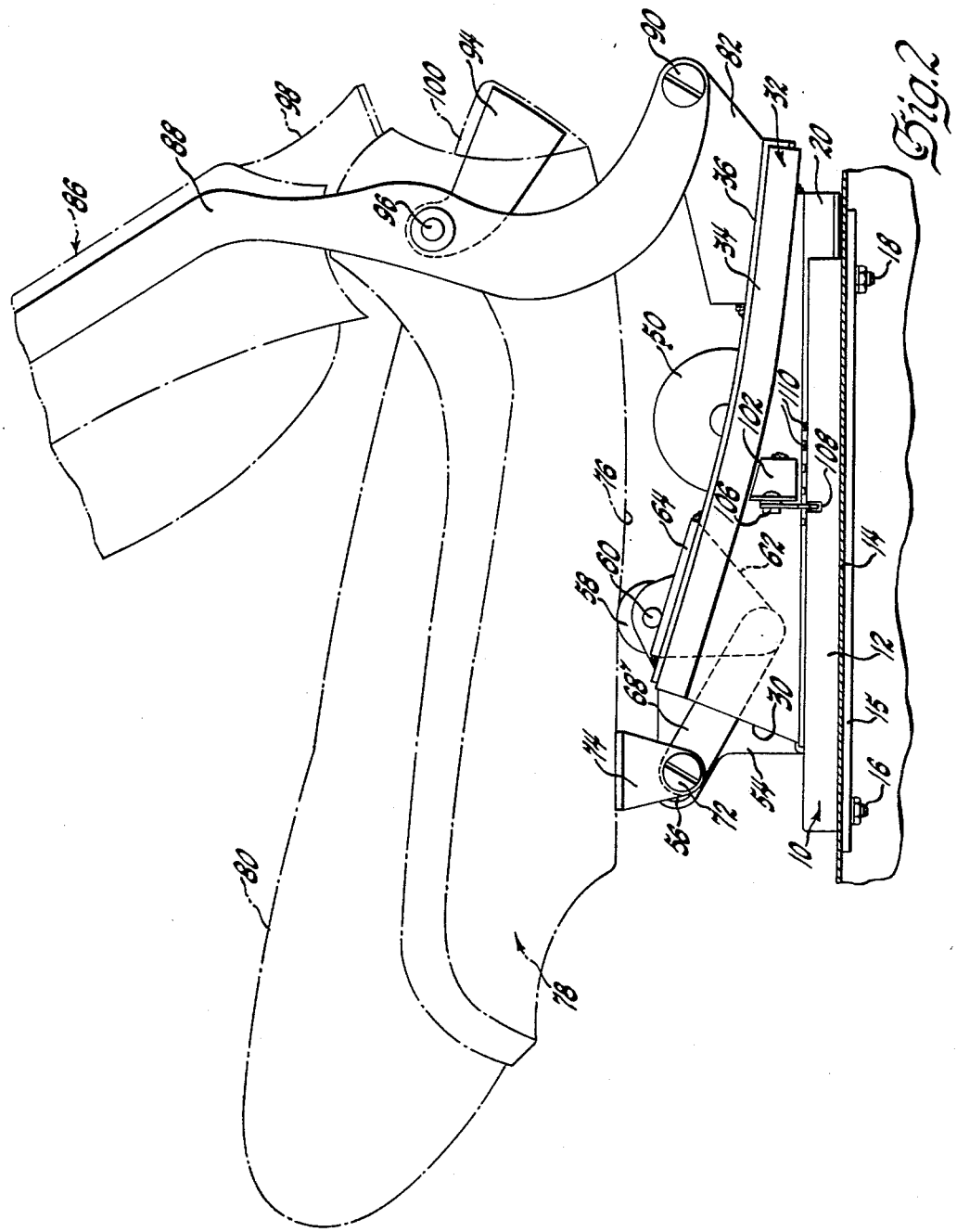

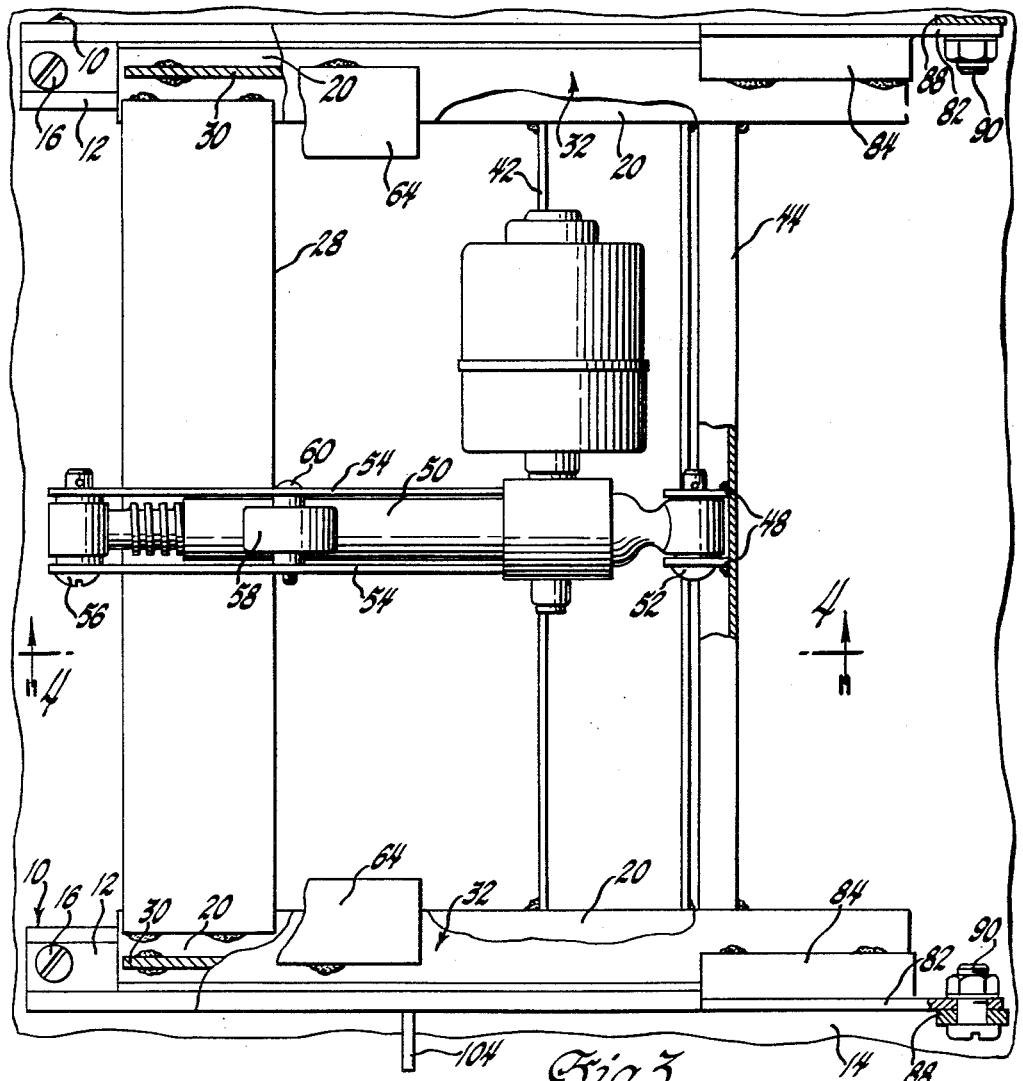
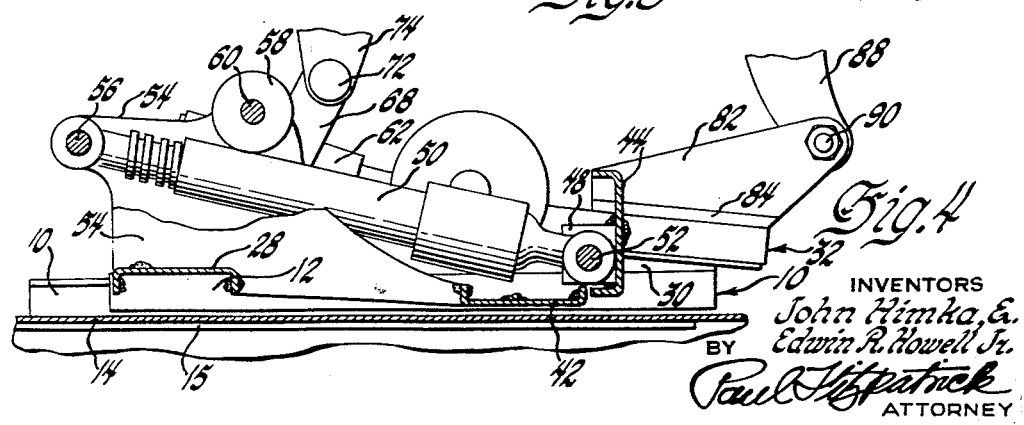

J. HIMKA ET AL 2,942,646

VEHICLE SEAT ADJUSTING MECHANISM

Filed Jan. 18, 1956

INVENTORS
John Himka, &
BY Edwin R. Howell Jr.
Paul Fitzpatrick
ATTORNEY

United States Patent Office 2,942,646
Patented June 28, 1960

2,942,646

VEHICLE SEAT ADJUSTING MECHANISM

John Himka, Detroit, and Edwin R. Howell, Jr., Royal Oak, Mich., assignors to General Motors Corporation, Detroit, Mich., a corporation of Delaware Filed Jan. 18, 1956, Ser. No. 559,810

3 Claims. (Cl. 155—14)

This invention relates to vehicle seat adjusting mechanisms and more particularly to a vehicle seat adjusting mechanism which will adjust the seat in both horizontal and vertical directions and which also includes an easy entrance feature to provide increased clearance space for entry and exit of passengers.

The seat adjusting mechanism of this invention, in its preferred embodiment, includes upper and lower linear adjusting means. The upper adjusting means is of arcuate shape to adjust the seat in vertical directions and is supported by the lower adjusting means which adjusts the seat in horizontal directions. A vehicle seat back is swingably mounted on the upper linear adjusting means and a vehicle seat bottom has its forward portion swingably mounted on the upper adjusting means and its rear portion swingably supported by the seat back. Power operating means are supported by the lower linear adjusting means and operatively secured to the upper linear adjusting means for movement thereof selectively and independently of movement of the lower adjusting means.

Movement of the lower adjusting means will adjust the seat in horizontal directions, and movement of the upper adjusting means through the power actuating means will adjust the seat in vertical directions by adjusting the variable spaced relationship between the upper adjusting means and the lower adjusting means. Upon tilting movement of the seat back the seat bottom is bodily displaced forwardly of both linear adjusting means to provide an easy entrance feature. Since both the seat back and the seat bottom are movable independently of the upper and lower adjusting means, the easy entrance feature may be operated either independently of horizontal or vertical adjustment of the seat or operated simultaneously with vertical or horizontal adjustment of the seat.

An object of this invention is to provide a vehicle seat adjusting mechanism which will adjust the seat in both horizontal and vertical directions. Another object of this invention is to provide a vehicle seat adjusting mechanism which will adjust the seat in both horizontal and vertical directions and which includes an easy entrance feature to provide increased clearance space for entry and exit of passengers. A further object of this invention is to provide a vehicle seat adjusting mechanism which will adjust the seat in both horizontal and vertical directions and which includes an easy entrance feature which may be operated selectively and independently of either horizontal or vertical adjustment of the seat. Yet another object of this invention is to provide a vehicle seat adjusting mechanism which will adjust the seat in both horizontal and vertical directions and which includes an easy entrance feature which may be operated selectively and independently of either horizontal or vertical adjustment of the seat or which may be operated simultaneously with either horizontal or vertical adjustment of the seat.

These and other objects of this invention will be readily apparent from the following specification and drawings, in which:

Figure 1 is a side elevational view of a vehicle front seat embodying a seat adjusting mechanism according to this invention;

Figure 2 is a view similar to Figure 1 showing the seat temporarily bodily displaced to provide increased clearance space for passenger entry and exit;

Figure 3 is a top plan view of the seat adjusting mechanism of Figure 1 taken on the plane indicated by line 3—3 of Figure 1;

Figure 4 is a sectional view taken on the plane indicated by line 4—4 of Figure 3 with parts broken away for clarity of illustration;

Figures 5, 6:
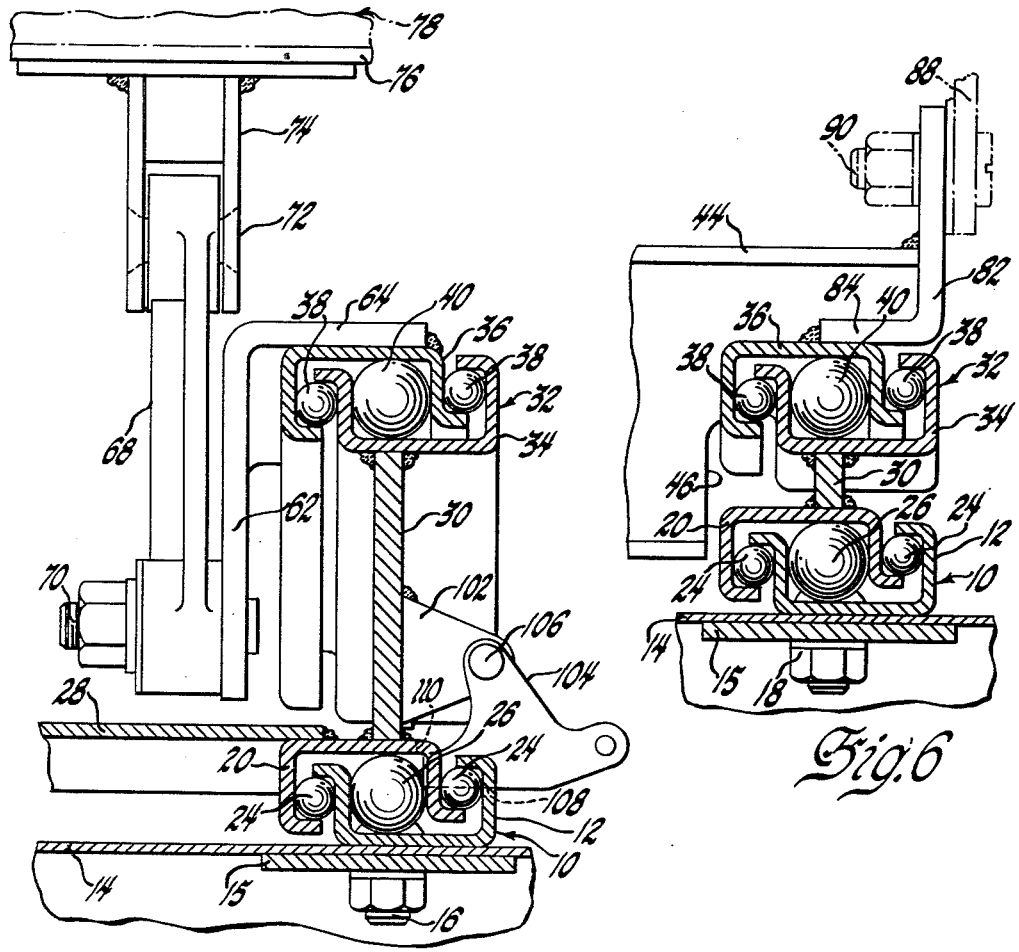
Figure 5 is a sectional view taken on the plane indicated by line 5—5 of Figure 1.
Figure 6 is a sectional view taken on the plane indicated by line 6—6 of Figure 1.

Before proceeding with a description of the seat adjusting mechanism, it will be understood that the mechanism is the same on either side of the seat and, therefore, only one such mechanism will be described. The other mechanism is of the same construction as the one described although of different hand.

Referring now to Figures 1, 5, and 6 of the drawings, a lower track assembly 10 includes a lower track member 12 which is bolted to the vehicle floor pan 14 and reinforcing member 15 at 16 and 18, and an upper track member 20 which is slidably mounted on the lower track member for horizontal movement relative thereto by means of a number of ball bearings 24 and 26. A channel-shaped cross member 28 is welded to the upper track member 20 of each lower track assembly adjacent their forward edges to insure that the upper track members move an equal distance upon horizontal adjustment of the seat. A web or plate 30 is welded at its lower edge to the upper track member 20 and the upper edge of this plate is of arcuate shape as can be seen in Figure 1. An upper track assembly 32 of arcuate shape includes a lower track member 34 which is welded to the upper edge of plate 30 and an upper track member 36 which is slidably mounted on the lower track member by means of a number of ball bearings 38 and 40. Since the upper track member 36 of the upper track assembly 32 is of arcuate shape, it is located in variable vertically spaced relationship with the lower track assembly. Linear adjustment of the upper track member 36 will adjust the variable vertically spaced relationship between this track member and the lower track assembly to adjust the seat in vertical directions.

Referring now to Figures 1, 3, 4 and 6, a channel-shaped cross member 42 is welded to the upper track members 20 of each lower track assembly adjacent the rear ends of these track members and cooperates with cross member 28 in insuring that the upper track members 20 move an equal distance upon horizontal adjustment of the seat. A channel-shaped cross member 44 is welded to the upper track members 36 of each upper track assembly adjacent the rear edges of the track members and includes a cut out portion 46, Figure 6, on either side to provide clearance between the cross member and the lower track assemblies. A pair of brackets 48 are welded to the base of cross member 44 intermediate the spaced seat adjusting mechanisms. One end of a motor driven screw jack assembly 50 is pivotally mounted between brackets 48 at 52. A pair of brackets 54 are welded to the rear cross member 42 and to the forward cross member 28 and are located in upright spaced relationship. The other end of the motor driven screw jack 50 is pivotally mounted between brackets 54 at 56. A roller 58 is pivotally mounted at 60 between the spaced brackets 54 for a purpose to be hereinafter described.

Referring now particularly to Figures 1 and 5 of the drawings, a depending bracket 62 has its flange 64 welded to the upper track member 36 of the upper track assembly 32 adjacent the forward edge thereof. A link 68 has one end pivotally secured to bracket 62 at 70 and the other end pivotally mounted at 72 between the walls of a U-shaped bracket 74. Bracket 74 is welded or otherwise secured to the base wall 76 of a sheet metal seat base cushion frame 78, indicated schematically in the drawings, to swingably mount the forward portion of the seat base cushion frame on the seat adjusting mechanism. The seat base cushion frame supports a base cushion 80.

Referring now particularly to Figures 1 and 6, an upright bracket 82 includes a flange 84 which is welded or otherwise secured to the upper track member 36 of the upper track assembly adjacent the rear edge thereof. A sheet metal seat back cushion frame 86 includes a pair of depending arms 88 on either side thereof which are pivotally mounted at 90 on each bracket 82. The seat back cushion frame 86 supports a back cushion 92. A bracket 94 is welded to the rear wall 95 of the seat base cushion frame 78 and is pivotally secured at 96 to each arm 88 to swingably mount the rear portion of the seat base cushion frame 78 on the seat adjusting mechanism. A number of spaced vertical struts 98 indicated schematically in Figure 1 are secured to the seat back cushion frame 86 and are adapted to engage a laterally extending wall 100 of the seat base cushion frame 78 in the normal position of the seat to limit the rearward tilting movement of the seat back cushion frame and maintain the seat in its normal position.

If it is desired to adjust the seat in a rear horizontal direction, the passenger in the seat exerts a force against the seat back cushion 92 to cause the upper track members 20 of the lower track assemblies to slide rearwardly relative to the lower track members 12 of these assemblies. Likewise, if it is desired to adjust the seat in a forward horizontal direction, the passenger exerts a force against the seat base cushion 80 in a forward direction to cause the upper track members 20 to slide forwardly relative to the lower track members 12. A latch, Figures 1 and 5, is provided to hold the seat in any horizontally adjusted position. The latch includes an angle bracket 102 welded to plate 30 and pivotally supporting a latch dog 104 at 106. The latch dog swings in a slot 108 in the outer wall of the lower track member 12 and is adapted to fit within any one of a number of spaced slots 110 in the outer and upper walls of the upper track member 20 to hold the seat in any adjusted position. In the seat shown, a latch is provided on only one side of the seat.

If it is desired to adjust the seat in vertical directions, the motor driven screw jack 50 is operated to either extend or retract the screw jack. Upon extension of the screw jack, the cross member 44 which interconnects the upper track members 36 will be moved rearwardly relative to cross member 28 to cause the upper track members of the upper track assemblies to slide rearwardly on the lower track members 34 and lower the seat since the curve of the upper track assemblies has its highest portion adjacent the forward portion of the seat and its lowest portion adjacent the rear portion of the seat. Upon retraction of the screw jack assembly 50, the cross member 44 will be moved forwardly relative to cross member 28 to raise the seat as the upper track members 36 slide forwardly on the lower track members 34. Since the motor driven screw jack 50 is carried with the seat as the seat is adjusted to any horizontal position, the seat may be adjusted vertically regardless of the horizontal position of the seat. Similarly, the seat may be adjusted horizontally regardless of the vertical position of the seat.

If it is desired to bodily displace the seat in order to obtain increased clearance space for passenger entry and exit, the seat back cushion frame 86 is tilted forwardly as the seat back depending arms 88 swing counterclockwise about their pivots 90 on brackets 82. This will shift pivots 96 counterclockwise about pivots 90 and shift the seat base cushion frame 78 forwardly as links 68 swing about pivots 72 and 70. As the seat base cushion frame moves forwardly, the base wall 76 of the frame will engage roller 58 to limit the forward movement of the seat cushion by limiting the swinging movement of links 68. This will prevent the seat cushion base frame from bottoming on brackets 54 or the screw jack assembly 50. Since the length of links 68 between pivots 70 and 72 is less than the effective length of the seat back arms 88 between pivots 90 and 96, forward bodily displacement of the seat will result in the forward portion of the seat cushion base frame being moved forwardly and downwardly to a greater extent than the rear portion of the seat cushion base frame as can be seen from a comparison of Figures 1 and 2. The temporary bodily displaced position of the seat is shown in Figure 2.

It can be seen that the seat may be bodily displaced to provide an easy entrance feature regardless of the horizontal or vertical position of the seat and also selectively and independently of either horizontal or vertical adjustment of the seat or simultaneously therewith. If desired in certain installations, the seat back may be electrically interconnected with the motor of the screw jack assembly so that tilting movement of the seat back will automatically actuate the motor to adjust the seat in either vertical direction upon tilting movement of the seat back.

If desired to interlock the seat back cushion frame with the seat base cushion frame to provide a safety feature and prevent tilting movement of the seat back upon sudden stopping of the vehicle, an inertia latch may be provided. A suitable inertia latch is shown in application Serial Number 321,170, Semar, filed November 18, 1952, now Patent No. 2,737,229, and assigned to the assignee of the invention.

Thus, this invention provides a vehicle seat adjusting mechanism which will adjust the seat in both horizontal and vertical directions and which includes an easy entrance feature operable selectively and independently of either horizontal or vertical adjustment of the seat; operable simultaneously therewith; and operable regardless of the horizontal or vertical position of the seat. It will be appreciated that the seat adjusting mechanism of this invention has many particular advantages over presently known seat adjusting mechanisms having an easy entrance feature due to its provision for both horizontal and vertical adjustment of the seat and also easy entrance, each of which may be selectively and independently operated or simultaneously operated.

We claim:

1. A vehicle seat adjusting mechanism comprising, a support, a vehicle seat assembly including a seat back having a pair of spaced depending arms pivotally mounted on said support for forward swinging movement of said seat back relative thereto, a vehicle seat bottom having one portion thereof pivotally secured to said seat back depending arms in spaced relationship to the pivotal mounting thereof on said support, a pair of spaced links pivotally mounted on said support and pivotally secured to another portion of said seat bottom, the effective length of said arms between the pivotal mounting thereof on said support and the pivotal connection thereof to said seat bottom being greater than the effective length of said links whereby said seat bottom is bodily displaceable forwardly and downwardly relative to said support upon forward swinging movement of said seat back, means limiting the forward displaced position of said seat bottom with respect to said support, and cooperating means on said seat back and said seat bottom for locating said seat back and said seat bottom in a non-displaced position.

2. A vehicle seat adjusting mechanism comprising, a support, a vehicle seat assembly including a seat back having a pair of spaced depending arms pivotally mounted on said support for forward swinging movement of said seat back relative thereto, a vehicle seat bottom having the rear portion thereof pivotally secured to said seat back depending arms in spaced relationship to the pivotal mounting thereof on said support, a pair of spaced links pivotally mounted on said support and pivotally secured to the forward portion of said seat bottom, the effective length of said arms between the pivotal mounting thereof of said support and the pivotal connection thereof to said seat bottom being greater than the effective length of said links whereby said seat bottom is bodily displaceable forwardly and downwardly relative to said support upon forward swinging movement of said seat back, means limiting the forward displaced position of said seat bottom with respect to said support, and rigid means on the lower edge of said seat back and on the rear portion of said seat bottom having mating surfaces engageable with each other for locating said seat back and said seat bottom in a non-displaced position.

3. A vehicle seat adjusting mechanism comprising, a support, a vehicle seat assembly including a seat back having a pair of spaced depending arms pivotally mounted on said support for forward swinging movement of said seat back relative thereto, a vehicle seat bottom having the rear portion thereof pivotally secured to said seat back depending arms in spaced relationship to the pivotal mounting thereof on said support, a pair of spaced links pivotally mounted on said support and pivotally secured to the forward portion of said seat bottom, the effective length of said arms between the pivotal mounting thereof on said support and the pivotal connection thereof to said seat bottom being greater than the effective length of said links whereby said seat bottom is bodily displaceable forwardly and downwardly relative to said support upon forward swinging movement of said seat back, means on said support engageable with said seat bottom upon displacement thereof for limiting the forward displaced position of said seat bottom with respect to said support, and rigid means on the lower edge of said seat back and on the rear portion of said seat bottom having mating surfaces engageable with each other for locating said seat back and said seat bottom in a non-displaced position.

References Cited in the file of this patent

UNITED STATES PATENTS

| | | |
|---|---|---|
| 2,160,015 | Haberstump | May 30, 1939 |
| 2,205,696 | Rhodes | June 25, 1940 |
| 2,219,456 | Saunders et al. | Oct. 29, 1940 |
| 2,579,599 | Moroney | Dec. 25, 1951 |
| 2,596,033 | King | May 6, 1952 |
| 2,660,223 | Appleton | Nov. 24, 1953 |
| 2,738,829 | Rowe | Mar. 20, 1956 |
| 2,765,024 | Brundage | Oct. 2, 1956 |
| 2,784,764 | Rigby et al. | Mar. 12, 1957 |
| 2,809,688 | Brundage | Oct. 15, 1957 |
| 2,826,241 | Himka | Mar. 11, 1958 |

FOREIGN PATENTS

| | | |
|---|---|---|
| 249,708 | Italy | Aug. 7, 1926 |
| 345,908 | Great Britain | Apr. 2, 1931 |